US012800032B2

(12) United States Patent
Colby

(10) Patent No.: US 12,800,032 B2
(45) Date of Patent: Nov. 17, 2026

(54) RESETTABLE PYROTECHNICALLY-ACTUATED POPPET VALVE

(71) Applicant: Triton Space Technologies, LLC, Woburn, MA (US)

(72) Inventor: Luke S. Colby, Woburn, MA (US)

(73) Assignee: Triton Space Technologies, LLC, Woburn, MA (US)

( * ) Notice: Subject to any disclaimer, the term of this patent is extended or adjusted under 35 U.S.C. 154(b) by 230 days.

(21) Appl. No.: 18/235,519

(22) Filed: Aug. 18, 2023

(65) Prior Publication Data

US 2025/0060039 A1 Feb. 20, 2025

(51) Int. Cl.
*F16K 1/12* (2006.01)
*F15B 15/19* (2006.01)
*F16K 31/122* (2006.01)

(52) U.S. Cl.
CPC .............. *F16K 1/126* (2013.01); *F15B 15/19* (2013.01); *F16K 31/122* (2013.01)

(58) Field of Classification Search
CPC ........ F16K 1/126; F16K 31/122; F15B 15/19; F15B 15/261
USPC .......... 137/668.13, 68.11, 70, 457, 456, 467, 137/468, 459, 463
See application file for complete search history.

(56) References Cited

U.S. PATENT DOCUMENTS 2,910,082 A 10/1959 Ferguson
3,111,133 A 11/1963 Fulton et al.
3,202,162 A 8/1965 Eckardt et al.
3,260,272 A 7/1966 Eckardt
3,307,786 A * 3/1967 Salerno .................. F16K 31/42 137/489.5
3,474,809 A 10/1969 Gordon
3,566,907 A * 3/1971 Sime .................. F16K 37/0008 137/553
3,802,459 A 4/1974 Geraudie
3,810,485 A 5/1974 Gawlick et al.
4,412,420 A 11/1983 Patrichi et al.
(Continued)

FOREIGN PATENT DOCUMENTS

CN 209856398 U 12/2019
CN 115095692 A 9/2022
(Continued)

*Primary Examiner* — Michael R Reid
*Assistant Examiner* — Andrew J Rost
(74) *Attorney, Agent, or Firm* — Kilpatrick Townsend & Stockton LLP

(57) ABSTRACT

Various embodiments of resettable pyrotechnically actuated poppet valve systems are disclosed herein. A resettable pyrotechnically actuated poppet valve system includes a pin assembly including a pin for engaging a moveable poppet closed against a valve seat and a shoulder for supporting the pin when a pyrotechnic device is disengaged. The system includes a valve body coupled to the pin assembly. The valve body includes an inlet and an outlet. The system includes an internal valve body disposed within the valve body. The moveable poppet is at least partially disposed within the internal valve body for contacting the valve seat. The pin maintains the poppet closed against the valve seat in a first position when the pyrotechnic device is disengaged and the poppet transitions to a second position by movement of the pin when the pyrotechnic device is engaged.

6 Claims, 11 Drawing Sheets

(56) References Cited

U.S. PATENT DOCUMENTS

| | | | | |
|---|---|---|---|---|
| 4,619,284 | A | 10/1986 | Delarue et al. | |
| 6,131,878 | A * | 10/2000 | Horstmann | F15B 15/261<br>251/12 |
| 6,202,671 | B1 * | 3/2001 | Horstmann | F02K 9/58<br>137/219 |
| 6,637,448 | B2 | 10/2003 | Naab et al. | |
| 8,020,833 | B2 | 9/2011 | Sun et al. | |
| 8,499,845 | B2 | 8/2013 | Lüders et al. | |
| 9,086,158 | B2 | 7/2015 | Sanders et al. | |
| 9,423,034 | B2 | 8/2016 | Colby | |
| 2007/0240417 | A1 | 10/2007 | Hirooka et al. | |
| 2019/0072195 | A1 * | 3/2019 | van Schoor | F16K 17/082 |

FOREIGN PATENT DOCUMENTS

| | | | | |
|---|---|---|---|---|
| EP | 0627786 | A1 * | 12/1994 | B64G 1/6457 |
| EP | 0 753 694 | B1 | 1/2000 | |
| GB | 1 343 802 | A | 1/1974 | |
| GB | 2 382 121 | B | 7/2004 | |
| JP | 55152903 | A | 11/1980 | |
| JP | 5296473 | B2 | 6/2013 | |

* cited by examiner

RESETTABLE PYROTECHNICALLY-ACTUATED POPPET VALVE

BACKGROUND OF THE INVENTION

Closed pyrotechnic valves are actuated by pyrotechnic devices such as pyro initiators. Pyrotechnic devices can be activated by an electrical signal and pyrotechnic gases combust within a chamber for driving components of the pyrotechnic valves attached thereto. Pyrotechnic valves have moveable elements within that open a flow path in response to the combustion. For example, various designs of pyrotechnic valves include membranes which are destroyed during actuation. Other components of the pyrotechnic valves may be destroyed upon actuation making the pyrotechnic valves single use. Some membranes may be replaceable but the cost and time for this process often makes refurbishment undesirable. Contamination of the flow path with pyrotechnic gases may occur during the replacement which could lead to harmful results.

SUMMARY OF THE INVENTION

In one embodiment, a resettable pyrotechnically actuated poppet valve system includes a pin assembly including a pin for engaging a moveable poppet closed against a valve seat and a shoulder for supporting the pin when a pyrotechnic device is disengaged. The system includes a valve body coupled to the pin assembly. The valve body includes an inlet and an outlet. The system includes an internal valve body disposed within the valve body. The moveable poppet is at least partially disposed within the internal valve body for contacting the valve seat. The pin maintains the poppet closed against the valve seat in a first position when the pyrotechnic device is disengaged and the poppet transitions to a second position by movement of the pin when the pyrotechnic device is engaged.

The resettable pyrotechnically actuated poppet valve system optionally includes various embodiments. The system may include the pyrotechnic device that creates pressure in the pin assembly for displacing the pin from the shoulder when the pyrotechnic device is engaged. The pyrotechnic device may be built to NASA SEB 26100001. The pyrotechnic device may be selected from the group consisting of a National Aeronautics and Space Administration (NASA) Standard Initiator (NSI), a Triton Standard Initiator (TSI)-200, a TSI-300, an Ensign-Bickford Aerospace & Defense S76-191, and a Pacific Scientific Initiator 103377-500. The system may further include Belleville washers disposed around an extension portion of the moveable poppet where the Belleville washers provide a pre-load force against the valve seat when the pyrotechnic device is disengaged. The inlet may be removably coupled to the valve body and the poppet may be returnable to the first position after the pyrotechnic device is engaged and the inlet is decoupled from the valve body. The pin assembly may further include a crush cap for maintaining the pin within the pin assembly when the pyrotechnic device is engaged. A fluid and/or gas may be sealed at the inlet when the poppet is in the first position. The fluid and/or gas may flow through the inlet, around the internal valve body, and through the outlet when the poppet is in the second position.

In another embodiment, a resettable pyrotechnically actuated poppet valve system includes a pin assembly including a pin for engaging a moveable poppet closed against a valve seat and a shoulder for supporting the pin when a pyrotechnic device is disengaged. The system includes a valve body coupled to the pin assembly. The valve body includes an inlet and an outlet. The system includes an internal valve body disposed within the valve body. The internal valve body further includes a resealable port for receiving pressure within a channel. The pin maintains the poppet closed against the valve seat in a first position when the pyrotechnic device is disengaged. The poppet transitions to a second position by movement of the pin when the pyrotechnic device is engaged. The poppet is disposed within the internal valve body for contacting the valve seat. The poppet includes a sealed piston defining the channel. The pressure received in the channel returns the poppet to the first position after the pyrotechnic device is engaged.

The resettable pyrotechnically actuated poppet valve system optionally includes various embodiments. The system may include the pyrotechnic device that creates pressure in the pin assembly for displacing the pin from the shoulder when the pyrotechnic device is engaged. The pyrotechnic device may be built to NASA SEB 26100001. The pyrotechnic device may be selected from the group consisting of a National Aeronautics and Space Administration (NASA) Standard Initiator (NSI), a Triton Standard Initiator (TSI)-200, a TSI-300, an Ensign-Bickford Aerospace & Defense S76-191, and a Pacific Scientific Initiator 103377-500. The pin assembly may further include a crush cap for maintaining the pin within the pin assembly when the pyrotechnic device is engaged. The sealed piston may include an O-ring or spring energized seal. A fluid and/or gas may be sealed at the inlet when the poppet is in the first position. The fluid and/or gas may flow through the inlet, around the internal valve body, and through the outlet when the poppet is in the second position.

In yet another embodiment, a resettable pyrotechnically actuated poppet valve system includes a pin assembly including a pin for engaging a moveable poppet closed against a valve seat and a shoulder for supporting the pin when a pyrotechnic device is disengaged. The system includes a valve body coupled to the pin assembly. The valve body includes an inlet and an outlet. The poppet is disposed within the valve body for contacting the valve seat. The pin maintains the poppet closed against the valve seat in a first position when the pyrotechnic device is disengaged. The poppet transitions to a second position by translation of the pin when the pyrotechnic device is engaged.

The resettable pyrotechnically actuated poppet valve system optionally includes various embodiments. The system may further include a resetting screw received at least partially within the valve body to return the poppet to the first position after the pyrotechnic device is engaged. The system may include the pyrotechnic device that creates pressure in the pin assembly for displacing the pin from the shoulder when the pyrotechnic device is engaged. The pyrotechnic device may be built to NASA SEB 26100001. The pyrotechnic device may be selected from the group consisting of a National Aeronautics and Space Administration (NASA) Standard Initiator (NSI), a Triton Standard Initiator (TSI)-200, a TSI-300, an Ensign-Bickford Aerospace & Defense S76-191, and a Pacific Scientific Initiator 103377-500. The pin assembly may further include a crush cap for maintaining the pin within the pin assembly when the pyrotechnic device is engaged.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Pyrotechnic valves may be used in liquid and/or gaseous fluid systems of missiles, launch vehicles, spacecraft, undersea vehicles, oil, and gas drilling industries etc. Such valves are often initiated by NASA (National Aeronautics and Space Administration) Standard Initiators (NSI) which generate electrical signals to ignite explosive charges. Pyrotechnic valves are often one time use propulsion mechanisms for controlling propellant or pressurant systems. Two varieties of pyrotechnic valves include normally-closed (NC) or normally-open (NO) valves, depending on an initial state prior to actuation of the pyrotechnic charge. Both types of pyrotechnic valves are often characterized as being single use valves where various internal components of the valves are destroyed upon initiation and actuation.

Various embodiments of the present disclosure describe a pyrotechnically actuated poppet valve system that is reusable. Various embodiments described herein provide resettable pyrotechnic valves that can be reset “in situ”, i.e., within the system, and that avert the contamination issues described above. The pyrotechnically actuated poppet valve system includes a pin assembly coupled to a valve body having an internal valve body disposed within the valve body. The internal valve body includes a moveable poppet at least partially disposed within the internal valve body. The pin assembly may include a pin having a valve seat that engages the moveable poppet. The pin is supported by a shoulder in the pin assembly when the pyrotechnic device is disengaged. The pin may be translated within the pin assembly when a pyrotechnic device coupled to the pin assembly is engaged. According to at least some embodiments described herein, various components of the valve system are not destroyed during or after engagement of the pyrotechnic device such that the valve system is reusable.

Figure 1:
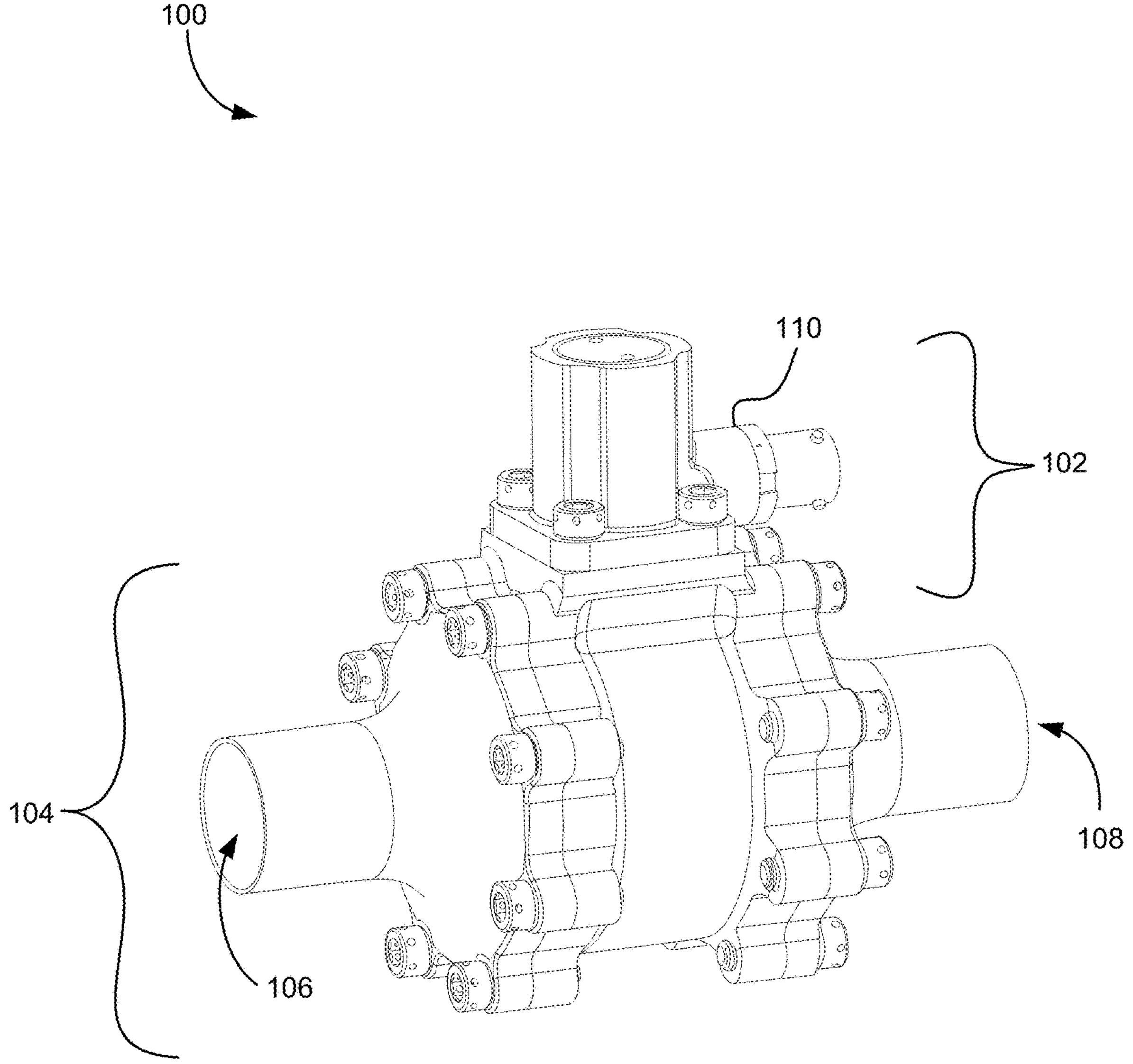
FIG. 1 is a perspective view of an embodiment of a resettable pyrotechnically actuated poppet valve system.

FIG. 1 is a perspective view of an embodiment of a resettable pyrotechnically actuated poppet valve system. Valve system 100 includes a pin assembly 102 and a valve body 104 coupled to the pin assembly 102. The valve body 104 includes an inlet 106 and an outlet 108. In various embodiments, the valve body 104 is configured to couple to a pyrotechnic device 110. For example, the pyrotechnic device 110 is an initiator for the valve system 100. In at least some embodiments, the pyrotechnic device 110 is a NASA NSI. For example, the NSI is a two-pin electrically activated, hot wire, electro-explosive. Other initiators may be used such as Triton Standard Initiator (TSI)-200, TSI-300, a Pacific Scientific Initiator 103377-500, etc. Any device built to NASA’s drawing SEB 26100001 for the NSI, such as the Ensign-Bickford Aerospace & Defense S76-191 or the Pacific Scientific Initiator 103377-500, may be used. According to some embodiments, lower cost devices not specifically built to NASA SEB 26100001 but having similar form factor and functionality, such as the Triton Space Technologies TSI-200 or TSI-300, may be used.

In at least some embodiments, the inlet 106 and the outlet 108 are separately removably couplable components, as shown in FIG. 1. For example, and as shown in FIG. 1, the inlet 106 and the outlet 108 are coupled to the valve body 104 via a system of screws, bolts, threaded members, etc. It would be appreciated by one having ordinary skill in the art upon reading the present disclosure that any coupling mechanism may be used to removably couple the inlet 106 and/or the outlet 108 to the valve body 104. According to at least some embodiments, the inlet 106 and/or the outlet 108 may be integrally formed as part of the valve body 104. For example, the inlet 106 and the outlet 108 may be integral channels on either end of the valve body 104.

According to some embodiments, the pin assembly 102 is removably couplable from the valve body 104. For example, and as shown in FIG. 1, the pin assembly 102 is coupled to the valve body 104 via a series of screws. It would be appreciated by one having ordinary skill in the art upon reading the present disclosure that any coupling mechanism may be used to removably couple the pin assembly 102 to the valve body 104. According to at least some embodiments, the pin assembly 102 may be integrally formed as part of the valve body 104.

Figure 2:
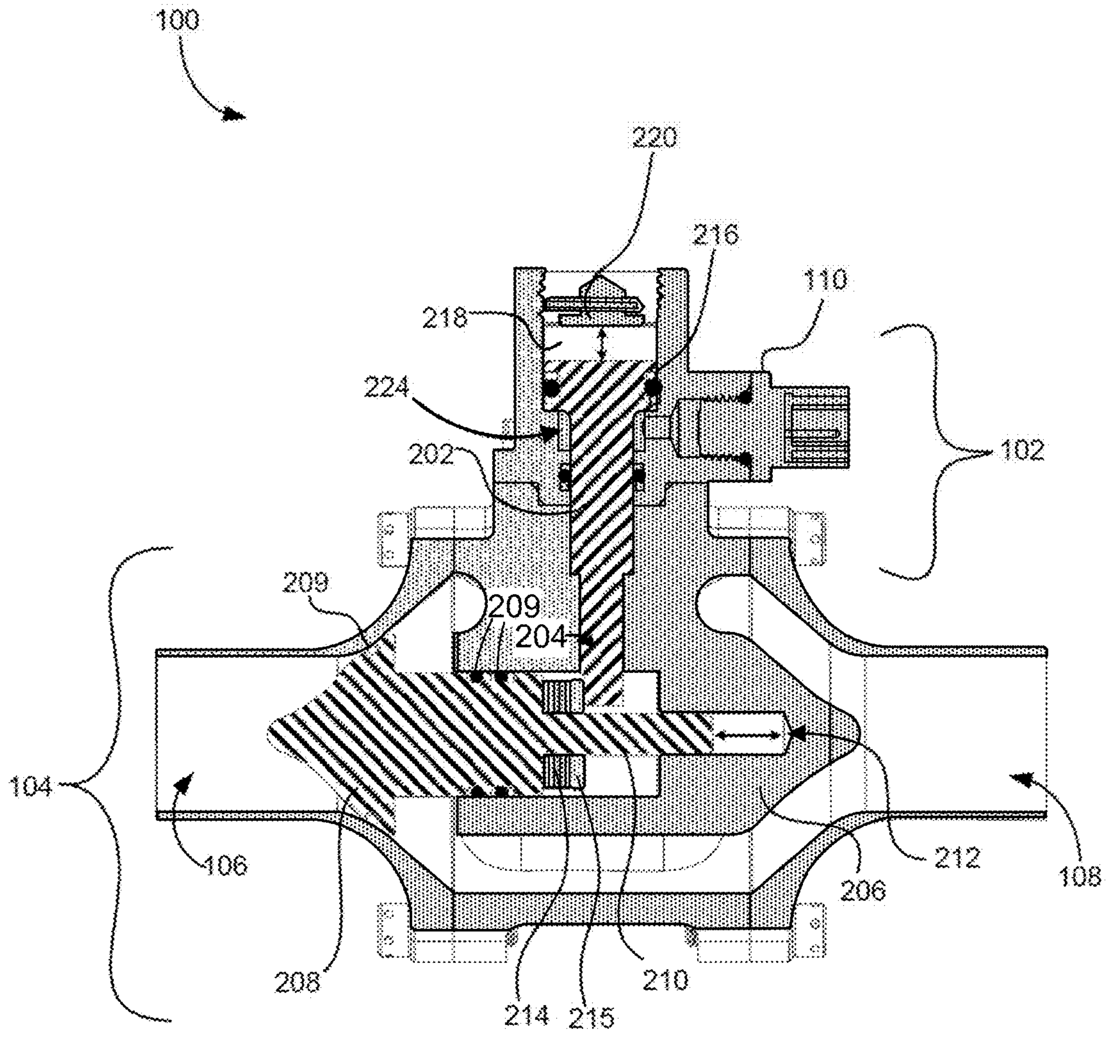
FIG. 2 is a side cross section of an embodiment of a resettable pyrotechnically actuated poppet valve system in a first position.

FIG. 2 is a side cross section of an embodiment of a resettable pyrotechnically actuated poppet valve system in a first position. The description of the valve system 100 described in relation to FIG. 1 is applicable to the side cross section of an embodiment of a resettable pyrotechnically actuated poppet valve system in a first position. Valve system 100 is shown in the first position where the pyrotechnic device 110 is disengaged. A pin 202 having a valve seat 204 is disposed within the pin assembly 102 and at least partially disposed within the internal valve body 206. The pin 202 is configured to translate within the pin assembly 102 when the pyrotechnic device 110 is engaged, to be described in further detail below.

In this cross section, the internal valve body 206 is shown disposed within the valve body 104. The internal valve body 206 may be at least partially funnel-shaped to direct a flow of fluid around the internal valve body 206 when the pyrotechnic device 110 is engaged. In at least some embodiments, the internal valve body 206 may include one or more channels (not shown) for directing the flow when the pyrotechnic device 110 is engaged. For example, in at least some embodiments, the internal valve body 206 includes a series of kidney-shaped channels along the internal valve body 206 perimeter for directing the flow.

A moveable poppet, e.g., poppet 208, is at least partially disposed within the internal valve body 206. The poppet 208 may be at least partially funnel-shaped to further direct the flow of fluid when the pyrotechnic device 110 is engaged. In some embodiments, the poppet 208 may include additional sealing elements 209, such as O-rings, spring energized seals or the like, disposed around the outer surface of the poppet 208 for sealing fluid at the inlet 106 and maintaining the position of the poppet 208 within the internal valve body 206. Any sealing elements, such as sealing elements 209, may be double seals (e.g., redundant seals). The poppet 208 contacts the valve seat 204 of the pin 202 when the pyrotechnic device 110 is disengaged. The valve seat 204 of the pin 202 maintains the poppet 208 closed (e.g., sealed) against the valve seat 204 and against the inlet 106 in the first position when the pyrotechnic device 110 is disengaged.

According to at least some embodiments, the poppet 208 includes an extension portion 210 which extends into a corresponding channel 212 of the internal valve body 206. The extension portion 210 of the poppet 208 is configured to translate within the channel 212 as the poppet 208 transitions between the first position and the second position, to be described in further detail below. Washers 214 may be disposed around the extension portion 210 of the poppet 208 as shown in FIG. 2. The washers 214 provide a pre-load force against the valve seat 204 when the pyrotechnic device 110 is disengaged. For example, the washers 214 are Belleville washers that are compressed between the valve seat 204 of the pin 202 and the poppet 208 when the pyrotechnic device 110 is disengaged. In various embodiments, a load-bearing washer 215 is disposed between the washers 214 and the valve seat 204 of the pin 202. The load-bearing washer 215 transfers the point load of the valve seat 204 circumferentially around the annular area of the washers 214 to prevent the washers 214 from asymmetrical loading. Such asymmetrical loading may create a bending moment on the washers 214 such that the washers 214 twist and an extension portion 210 of the poppet 208 jams. The washers 214 may be any coned-disc spring, conical spring washer, disc spring, cupped spring washer, etc., or any combination thereof. The washers 214 may be stacked in series or parallel for providing sufficient pre-load force against the valve seat 204 when the pyrotechnic device 110 is disengaged.

The pin assembly 102 may include a shoulder 216 for supporting the pin 202 when the pyrotechnic device 110 is disengaged. The pin 202 is configured to translate through the pin assembly channel 218 as the pyrotechnic device 110 is engaged. The crush cap 220 is configured to maintain the pin 202 within the pin assembly 102 when the pyrotechnic device 110 is engaged. For example, the pyrotechnic device 110 creates pressure in the pin assembly 102, e.g., in the expandable cavity 224. The pressure created by the pyrotechnic device 110 when the pyrotechnic device 110 is engaged fills the expandable cavity 224 and pushes the pin 202 up from the shoulder 216 toward the crush cap 220. The expandable cavity 224 increases in size with the increase of pressure therein. When the pyrotechnic device 110 is engaged, the pin 202 translates through the pin assembly channel 218 such that the valve seat 204 does not contact the washers 214 and/or the poppet 208 and the poppet 208 can translate to the second position, to be described in detail below.

In the first position, as shown in FIG. 2, fluid is sealed at the inlet 106 of the valve system by the poppet 208. Fluid does not flow through the inlet 106 or through the valve body 104 when the poppet 208 is in the first position. The poppet 208 may be funnel-shaped such that the poppet 208 extends through the inlet 106 and seals the inlet 106 in the first position. In other embodiments, the poppet 208 is not funnel-shaped but seals the inlet 106 such that no fluid flows through the inlet 106 into the valve body 104.

Figure 3:
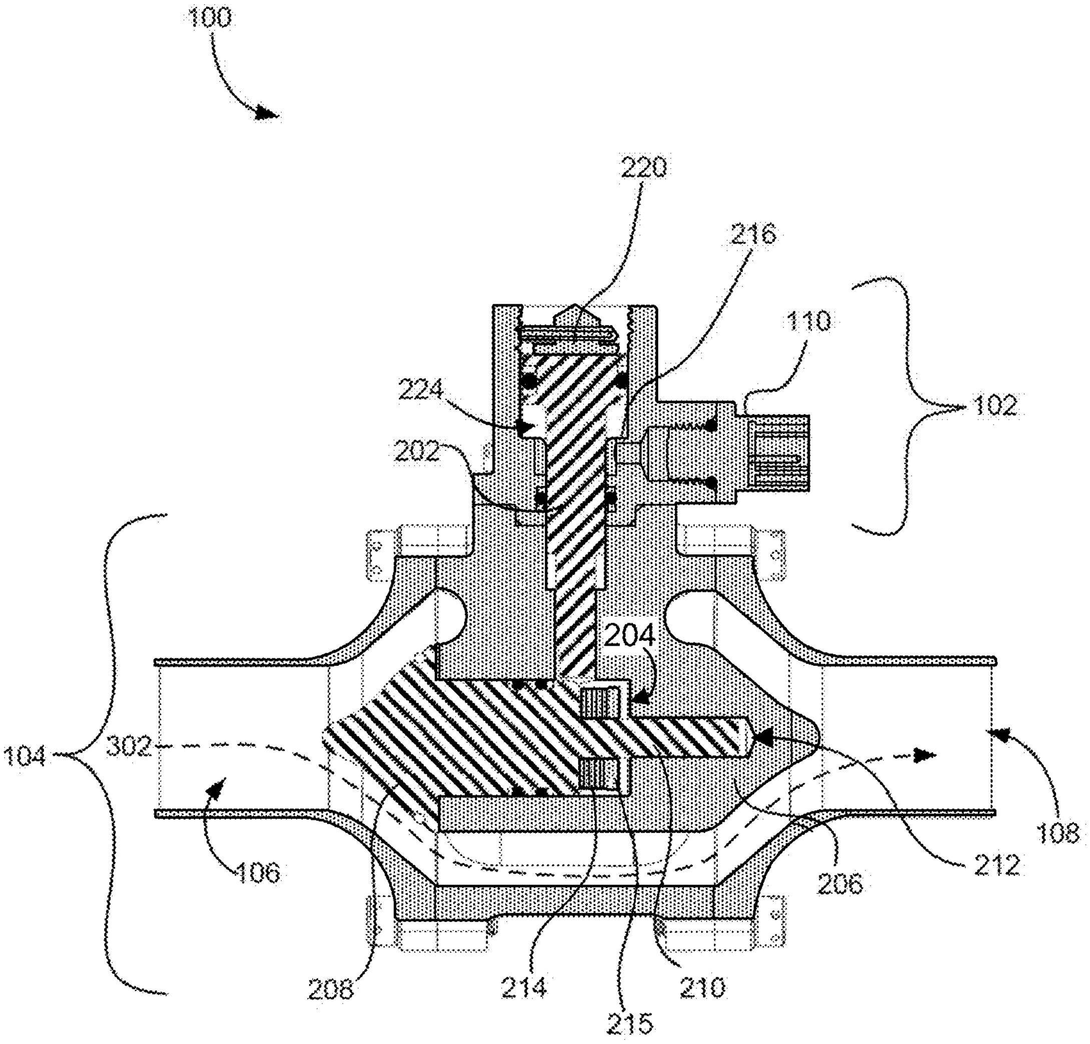
FIG. 3 is a side cross section of an embodiment of a resettable pyrotechnically actuated poppet valve system in a second position.

FIG. 3 is a side cross section of an embodiment of a resettable pyrotechnically actuated poppet valve system in a second position. The description of the valve system 100 described in relation to FIGS. 1-2 is applicable to the side cross section of an embodiment of a resettable pyrotechnically actuated poppet valve system in a second position. Valve system 100 is shown in the second position where the pyrotechnic device 110 is engaged.

The pin assembly 102 may include a shoulder 216 for supporting the pin 202 when the pyrotechnic device 110 is disengaged. The pin 202 translates through the pin assembly channel 218 as the pyrotechnic device 110 is engaged and contacts the crush cap 220 within the pin assembly 102. For example, the pyrotechnic device 110 creates pressure in the pin assembly 102, e.g., in the expandable cavity 224. The pressure created by the pyrotechnic device 110 when the pyrotechnic device 110 is engaged fills the expandable cavity 224 and pushes the pin 202 up from the shoulder 216 toward the crush cap 220. When the pyrotechnic device 110 is engaged, the pin 202 translates through the pin assembly channel 218 such that the valve seat 204 does not contact the washers 214, the load-bearing washer 215, and/or the poppet 208 and the poppet 208 can translate to the second position, as shown in FIG. 3. The poppet 208 may be at least partially forced further into (e.g., translated into) the internal valve body 206 by the flow 302. The release of pre-load pressure formed by the washers 214 may also contribute to translating the poppet 208 to the second position. When the poppet 208 translates to the second position, the extension portion 210 of the poppet 208 translates through the channel 212 such that the extension portion 210 extends further into the channel 212 than in the first position.

In the second position, as shown in FIG. 3, the flow 302 flows through the inlet 106 of the valve system 100, around the internal valve body 206, and through the outlet 108 when the poppet 208 is in the second position. In some embodiments, the internal valve body 206 includes cutouts (not shown) that further direct the flow 302 of fluid. The poppet 208 does not seal the fluid at the inlet 106 in the second position and directs flow 302 around the poppet 208 to the outlet 108.

In various embodiments, the valve system 100 is reusable. For example, the pin assembly 102 is replaceable as it is removably couplable to the valve body 104. The pin assembly 102 may be removed after actuation (e.g., engagement) of the pyrotechnic device 110 and replaced with a new pin assembly. In some embodiments, only the pyrotechnic device 110 is replaced. The valve system 100 described herein advantageously prevents significant damage to the valve body 104 and components therein. Accordingly, the valve system 100 may be reset by coupling a pin assembly to the valve body 104. Resetting the valve system 100 may further include loosening any screws, bolts, fasteners, etc., that removably couple the inlet 106 to the valve body 104 and vice versa, to reset the poppet 208. In various embodiments, an elongated tool (e.g., a pick or the like) is inserted into the pin assembly channel 218 to reposition the poppet 208, the washers 214, the load-bearing washer 215, etc., to the first position as shown and described in detail with respect to FIG. 2. A pin assembly may be coupled to the valve body 104. In some embodiments, a valve seat 204 of a pin 202 itself applies force at the load-bearing washer 215 such that the load-bearing washer 215, the washers 214, and/or poppet 208 translate toward the inlet 106 and into the first position, as shown and described in detail with respect to FIG. 2. After repositioning the poppet 208, the washers 214, the load-bearing washer 215, etc., any screws, bolts, fasteners, etc., that removably couple the inlet 106 to the valve body 104 and vice versa may be re-tensioned, thereby applying a pre-load on the poppet 208, the washers 214, the load-bearing washer 215, etc.

Figure 4:
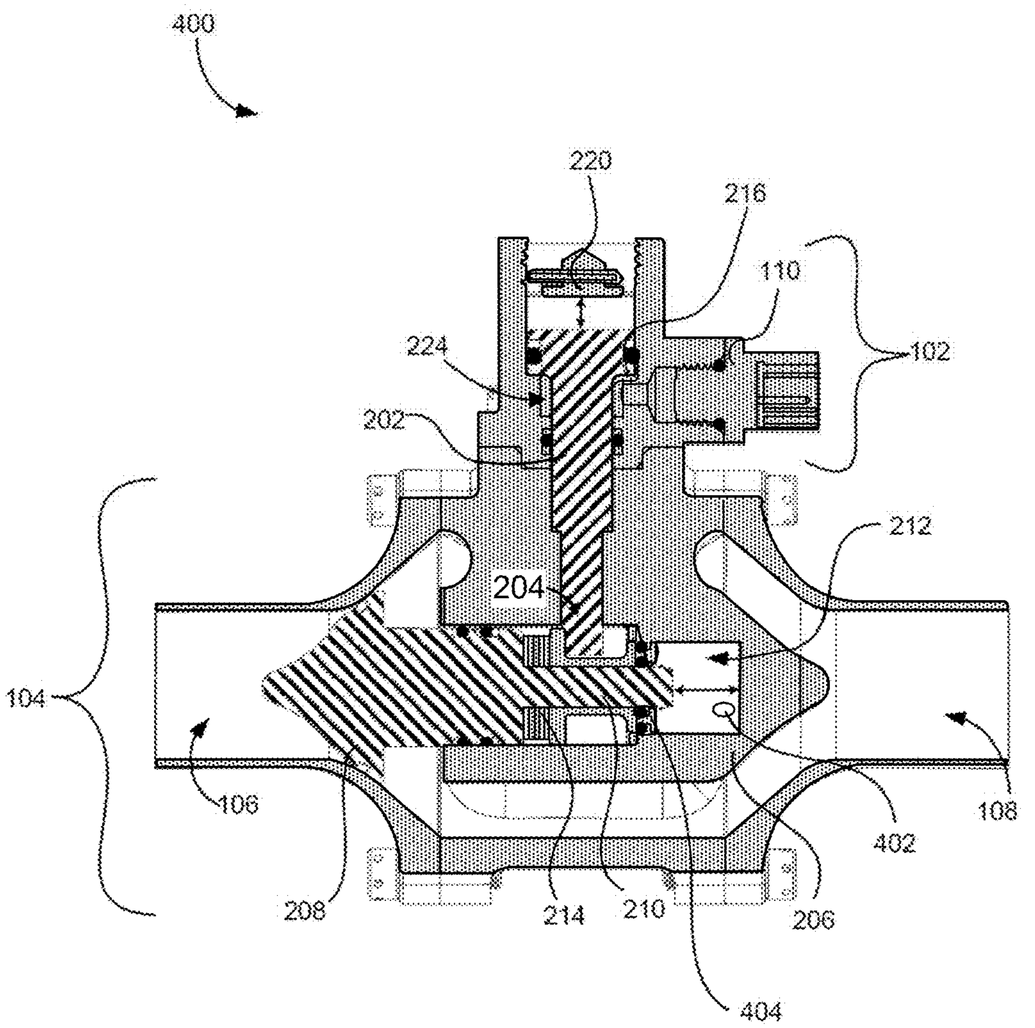
FIG. 4 is a side cross section of an embodiment of a resettable pyrotechnically actuated poppet valve system in a first position.

FIG. 4 is a side cross section of an embodiment of a resettable pyrotechnically actuated poppet valve system in a first position. The description of the valve system 100 described in relation to FIG. 1-3 is applicable to the side cross section of an embodiment of a resettable pyrotechnically actuated poppet valve system in a first position. Valve system 400 is shown in the first position where the pyrotechnic device 110 is disengaged. A pin 202 having a valve seat 204 is disposed within the pin assembly 102 and at least partially disposed within the internal valve body 206. The pin 202 is configured to translate within the pin assembly 102 when the pyrotechnic device 110 is engaged, as described in detail above.

In this cross section, the internal valve body 206 is shown disposed within the valve body 104. A moveable poppet, e.g., poppet 208, is at least partially disposed within the internal valve body 206. The poppet 208 may contact the washers 214 that contact a sealed piston 404, to be described in further detail below. The sealed piston 404 may contact the valve seat 204 of the pin 202 when the pyrotechnic device 110 is disengaged. The valve seat 204 of the pin 202 maintains the sealed piston 404, and thereby, the poppet 208, closed against the valve seat 204 and the against the inlet 106 in the first position when the pyrotechnic device 110 is disengaged.

According to at least some embodiments, the poppet 208 includes an extension portion 210 which extends into a corresponding channel 212 of the internal valve body 206. The extension portion 210 of the poppet 208 is configured to translate within the channel 212 as the poppet 208 transitions between the first position and the second position, to be described in further detail below. Washers 214 may be disposed around the extension portion 210 of the poppet 208 as shown in FIG. 4. The washers 214 provide a pre-load force between the poppet 208, the sealed piston 404, and the valve seat 204 when the pyrotechnic device 110 is disengaged.

The pin assembly 102 may include a shoulder 216 for supporting the pin 202 when the pyrotechnic device 110 is disengaged. The pin 202 is configured to translate through the pin assembly channel 218 as the pyrotechnic device 110 is engaged. The crush cap 220 is configured to maintain the pin 202 within the pin assembly 102 when the pyrotechnic device 110 is engaged while dissipating the energy of the motion of the pin 202. For example, the pyrotechnic device 110 creates pressure in the pin assembly 102, e.g., in the expandable cavity 224. The pressure created by the pyrotechnic device 110 when the pyrotechnic device is engaged fills the expandable cavity 224 and pushes the pin 202 up from the shoulder 216 toward the crush cap 220. When the pyrotechnic device 110 is engaged, the pin 202 translates through the pin assembly channel 218 such that the valve seat 204 does not contact the sealed piston 404 and/or washers 214 and/or the poppet 208 and the poppet 208 can translate to the second position.

In the first position, as shown in FIG. 4, fluid and/or gas is sealed at the inlet 106 of the valve system by the poppet 208. Fluid and/or gas does not flow through the valve body 104 when the poppet 208 is in the first position. The poppet 208 may be funnel-shaped such that the poppet 208 extends through the inlet 106 and seals the inlet 106. In other embodiments, such as a sleeve valve, the poppet 208 is not funnel-shaped but seals the inlet 106 such that no fluid flows through the inlet 106 into the valve body 104.

Valve system 400 includes a port 402 in the internal valve body 206. The port 402 may introduce gas and/or liquid into channel 212 to reset the valve system 400 after engaging the pyrotechnic device 110. For example, gas and/or liquid introduced into the channel 212 creates a pressure that forces the sealed piston 404 and, consequently, the washers 214 and the poppet 208 to translate toward the inlet 106 and the first position. The port 402 may be drilled through the internal valve body 206. In at least some embodiments, the port 402 extends at least 120 degrees from the axis of the poppet 208 such that gas and/or liquid enters the channel 212 at an angle. The port 402 may be coupled to a resealable port (not shown) on an outer surface of the valve body 104 that can be coupled to a source for the gas and/or liquid for introducing pressure into the channel 212 and translating the poppet 208 to the first position.

The valve system 400 may include a sealed piston 404. The sealed piston 404 may surround the extension portion 210 of the poppet 208 and defines the channel 212. Specifically, the sealed piston 404 defines a movable end of the channel 212. In at least some embodiments, the sealed piston 404 includes O-rings, spring energized seals, or other sealing elements which seal at least a portion of the perimeter of the sealed piston 404. The sealed piston 404 enables pressure to be applied behind the sealed piston 404 and delivered through the port 402 to the channel 212 such that the washers 214 are recompressed and, thereby, reset the poppet 208 and return the valve body 104 to the first position. The washers 214 are recompressed without decoupling any other component from the valve system 400 such as the inlet 106 if the inlet 106 is decouplable from the valve body 104. Pressure applied behind the sealed piston 404 and delivered through the port 402 pushes the sealed piston 404 and/or the washers 214 and/or poppet 208 to the first position from the second position and compresses the washers 214 in the same action.

Figure 5:
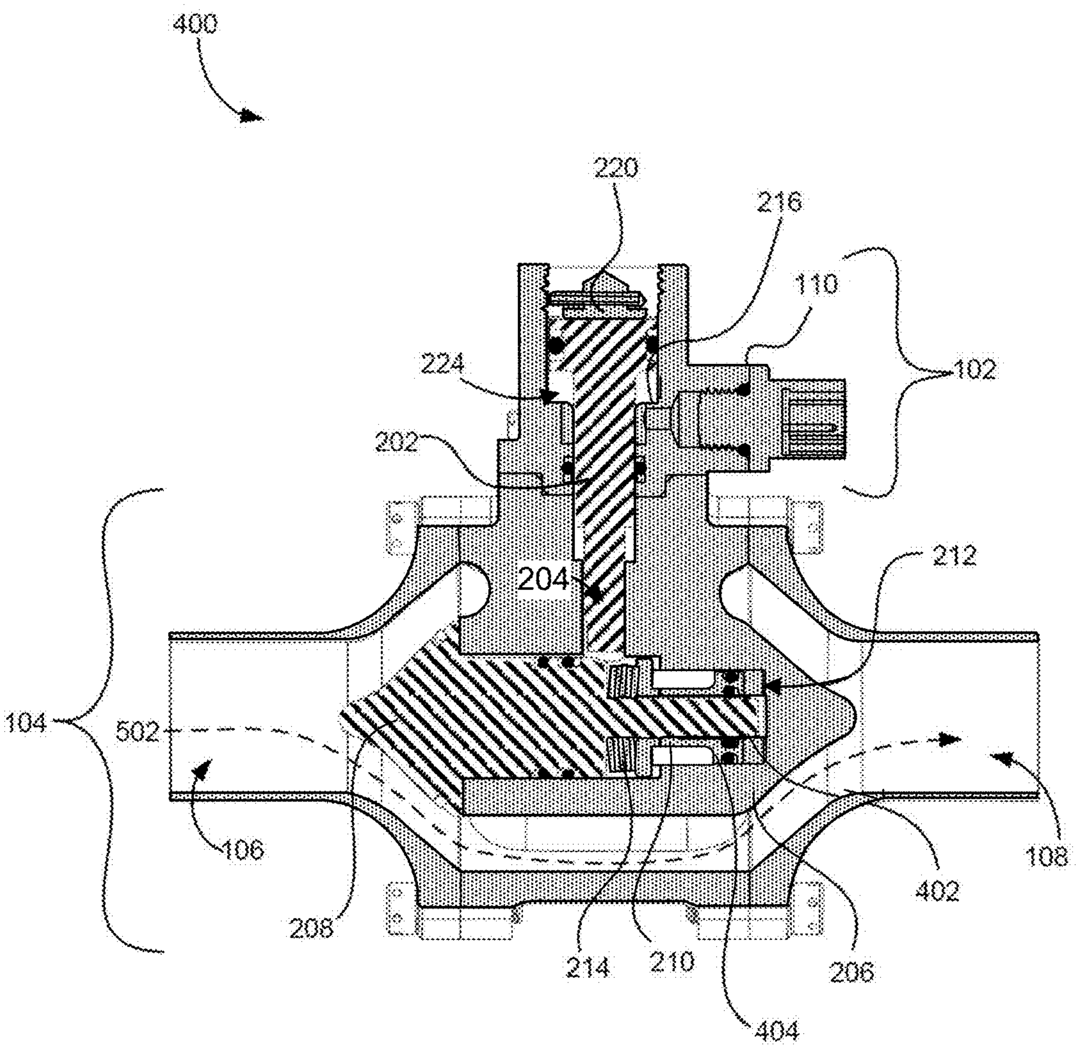
FIG. 5 is a side cross section of an embodiment of a resettable pyrotechnically actuated poppet valve system in a second position.

FIG. 5 is a side cross section of an embodiment of a resettable pyrotechnically actuated poppet valve system in a second position. The description of the valve system 100 and valve system 400 described in relation to FIGS. 1-4 is applicable to the side cross section of an embodiment of a resettable pyrotechnically actuated poppet valve system in a second position. Valve system 400 is shown in the second position where the pyrotechnic device 110 is engaged.

The pin assembly 102 may include a shoulder 216 for supporting the pin 202 when the pyrotechnic device 110 is disengaged. The pin 202 translates through the pin assembly channel 218 as the pyrotechnic device 110 is engaged and contacts the crush cap 220 within the pin assembly 102. For example, the pyrotechnic device 110 creates pressure in the pin assembly 102, e.g., in the expandable cavity 224. The pressure created by the pyrotechnic device 110 when the pyrotechnic device is engaged fills the expandable cavity 224 and pushes the pin 202 up from the shoulder 216 toward the crush cap 220. When the pyrotechnic device 110 is engaged, the pin 202 translates through the pin assembly channel 218 such that the valve seat 204 does not contact the sealed piston 404, washers 214 and/or the poppet 208 and the poppet 208 can translate to the second position, as shown in FIG. 5.

In the second position, as shown in FIG. 5, flow 502 flows through the inlet 106 of the valve system 400, around the internal valve body 206, and through the outlet 108 when the poppet 208 is in the second position. In some embodiments, the internal valve body 206 includes cutouts (not shown) that further direct the flow 502 of fluid.

Valve system 400 includes a port 402 in the internal valve body 206. The port 402 may introduce gas and/or liquid into channel 212 to reset the valve system 400 after engaging the pyrotechnic device 110. For example, gas and/or liquid introduced into the channel 212 creates a pressure that forces the sealed piston 404 and the washers 214 and poppet 208 to translate toward the inlet 106 and the first position. The port 402 may be drilled through the internal valve body 206. In at least some embodiments, the port 402 extends at least 120 degrees from the axis of the poppet 208 such that gas and/or liquid enters the channel 212 at an angle. The port 402 may be coupled to a resealable port (not shown) on an outer surface of the valve body 104 that can be coupled to a source for the gas and/or liquid for introducing pressure into the channel 212 and translating the poppet 208 to the first position.

The valve system 400 may include a sealed piston 404. The sealed piston 404 may surround the extension portion 210 of the poppet 208. In at least some embodiments, the sealed piston 404 includes O-rings, spring energized seals, or other sealing elements which seal at least a portion of the perimeter of the sealed piston 404. The sealed piston 404 enables pressure to be applied behind the sealed piston 404 and delivered through the port 402 such that the washers 214 are recompressed and, thereby, reset the poppet 208 and return the valve body 104 to the first position. The washers 214 are recompressed without decoupling any other component from the valve system 400 such as the inlet 106 if the inlet 106 is decouplable from the valve body 104. Pressure applied behind the sealed piston 404 and delivered through the port 402 pushes the sealed piston 404 and/or the washers 214 and/or poppet 208 to the first position from the second position and compresses the washers 214 in the same action. After the poppet is translated to the first position, a new pin assembly may be coupled to the valve body and a pin 202 may be translated down the pin assembly channel 218 and at least partially disposed within the internal valve body 206.

Figure 6:
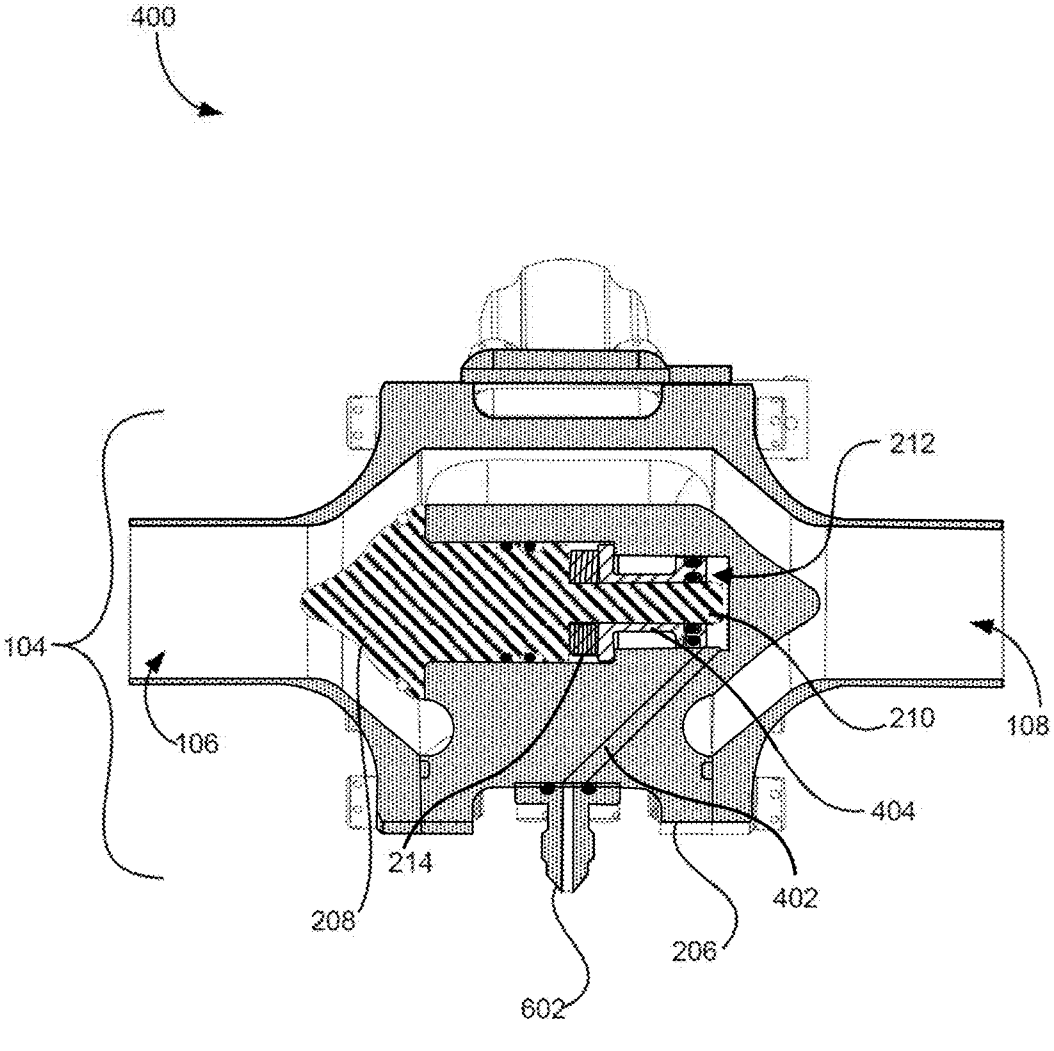
FIG. 6 is a top cross section of an embodiment of a resettable pyrotechnically actuated poppet valve system in a second position.

FIG. 6 is a top cross section of an embodiment of a resettable pyrotechnically actuated poppet valve system in a second position. The description of the valve system 100 and valve system 400 described in relation to FIGS. 1-5 is applicable to the top cross section of an embodiment of a resettable pyrotechnically actuated poppet valve system in a second position. In this view, the valve system 400 includes a port 402 in the internal valve body 206. The port 402 may introduce gas and/or liquid into channel 212 to reset the valve system 400, as described above. The port 402 is drilled through the internal valve body 206 and the port 402 extends at an angle between 10 degrees and 90 degrees, inclusive, from the axis of the poppet 208 as shown in FIG. 6.

Figure 7:
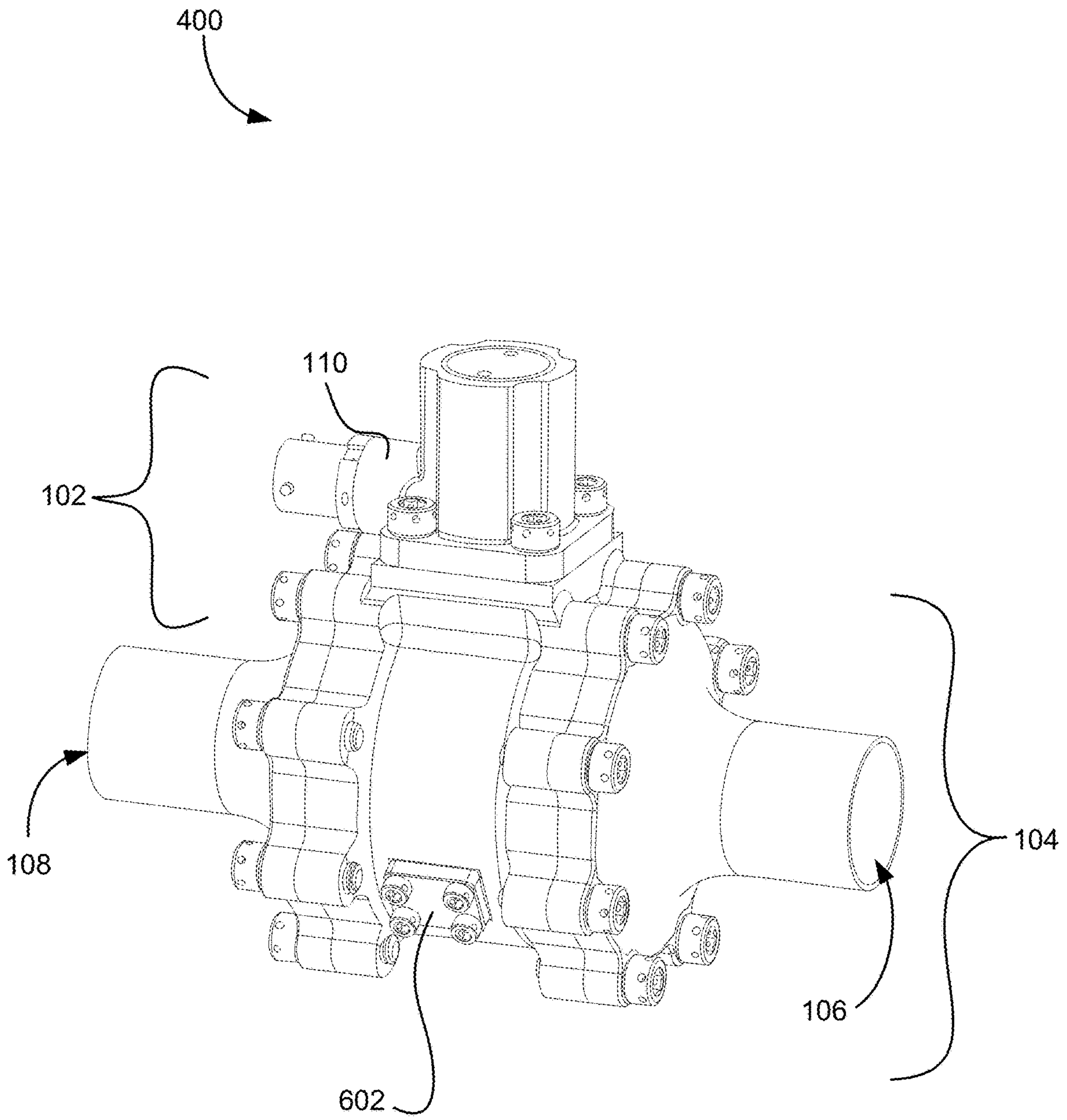
FIG. 7 is a perspective view of an embodiment of a resettable pyrotechnically actuated poppet valve system having a sealed resealable port.

FIG. 7 is a perspective view of an embodiment of a resettable pyrotechnically actuated poppet valve system having a sealed resealable port. The description of the valve system 100 and valve system 400 described in relation to FIGS. 1-6 is applicable to the perspective view of an embodiment of a resettable pyrotechnically actuated poppet valve system having a sealed resealable port. In this view, resealable port 602 is shown in the sealed position. The resealable port 602 is coupled to the port 402 (not shown) for introducing a gas and/or a liquid into a channel of the internal valve body for resetting the valve system 400 as described in detail above. In at least some embodiments, the resealable port 602 is sealed off with a closeout plate. In other embodiments, the resealable port 602 is sealed shut using any other mechanism. For example, the resealable port 602 may be an interchangeable lid having threads that correspond to threads on the outer surface of the valve body 104 for sealing the resealable port 602.

Figure 8:
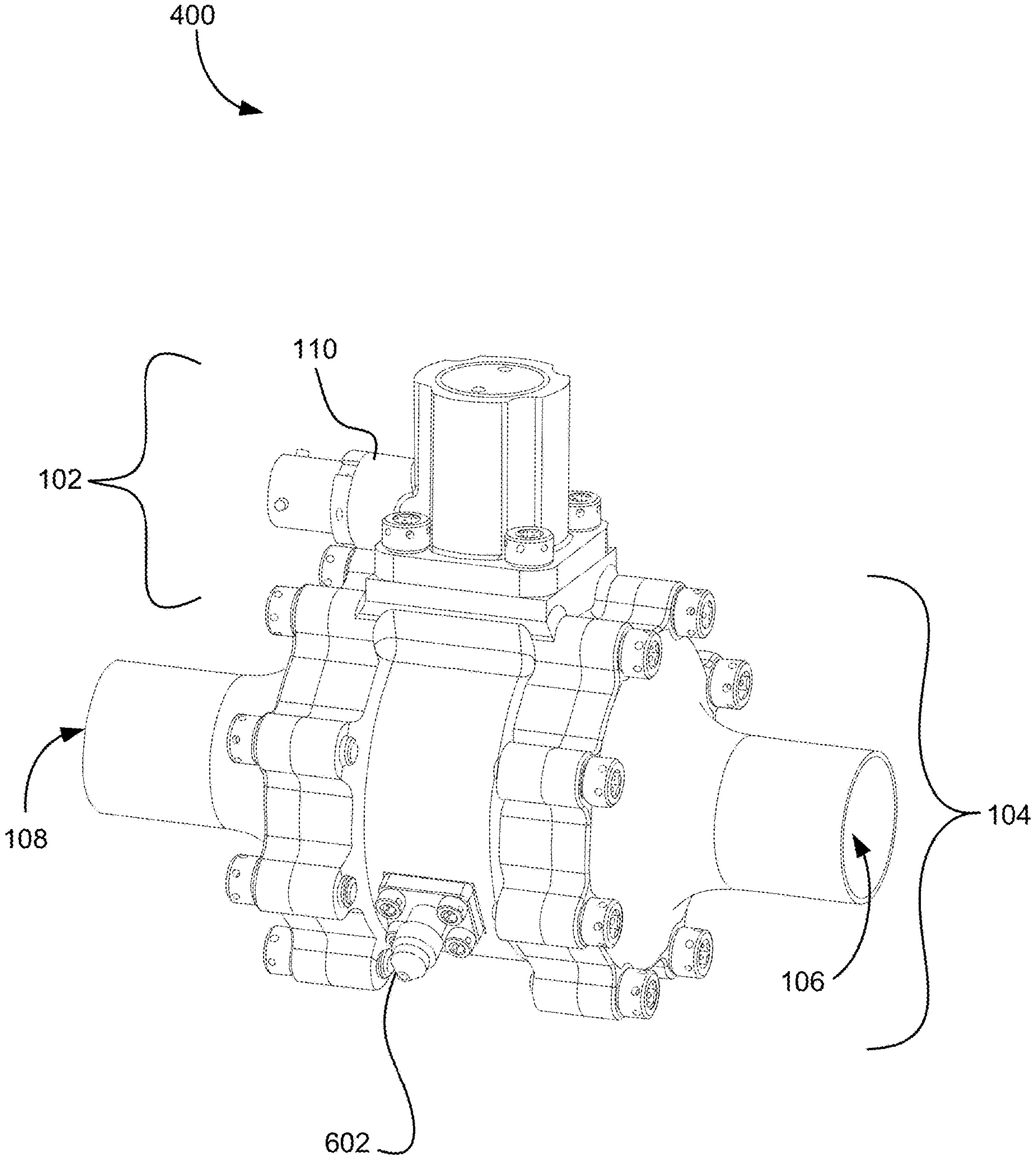
FIG. 8 is a perspective view of an embodiment of a resettable pyrotechnically actuated poppet valve system having a fitting element coupled to the resealable port.

FIG. 8 is a perspective view of an embodiment of a resettable pyrotechnically actuated poppet valve having a fitting element coupled to the resealable port. The description of the valve system 100 and valve system 400 described in relation to FIGS. 1-7 is applicable to the perspective view of an embodiment of a resettable pyrotechnically actuated poppet valve system having a sealed resealable port. In this view, resealable port 602 is shown in the unsealed position. The resealable port 602 is coupled to the port 402 (not shown) for introducing a gas and/or a liquid for resetting the valve system 400 as described in detail above. In at least some embodiments, the resealable port 602 includes a fitting port to apply resetting pressure into the valve system 400. Other types of fittings may be used to introduce a liquid and/or a gas through the resealable port 602.

Figure 9:
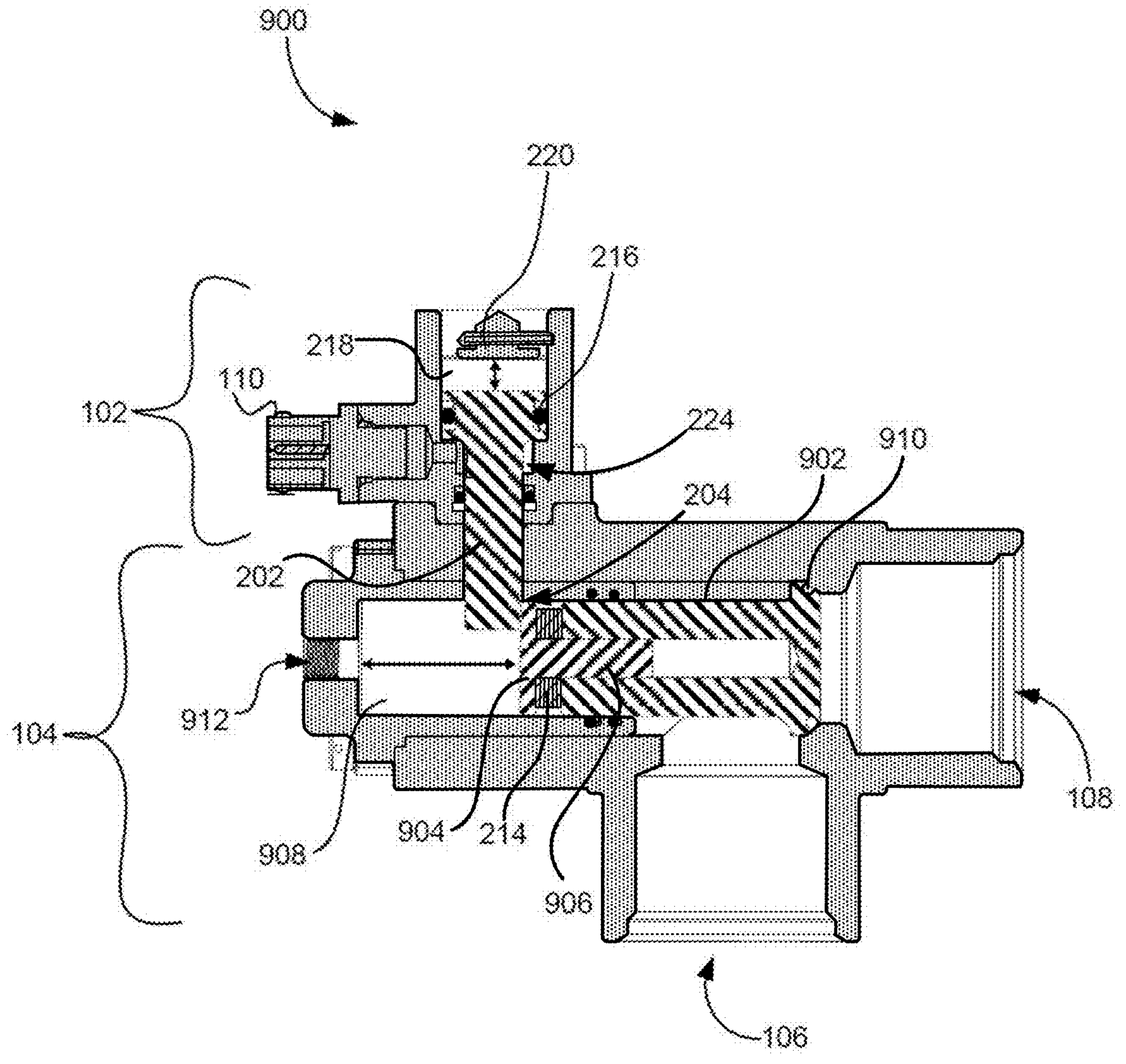
FIG. 9 is a side cross section of an embodiment of a resettable pyrotechnically actuated poppet valve system in a first position.

FIG. 9 is a side cross section of an embodiment of a resettable pyrotechnically actuated poppet valve system in a first position. The description of the valve system 100 and valve system 400 described in relation to FIGS. 1-8 is applicable to the side cross section of an embodiment of a resettable pyrotechnically actuated poppet valve system in a first position. Valve system 900 is shown in the first position where the pyrotechnic device 110 is disengaged. A pin 202 having a valve seat 204 is disposed within the pin assembly 102 and at least partially disposed within the valve body 104.

In this cross section, the poppet 902 is shown disposed within the valve body 104. A moveable bearing 904 is at least partially disposed within the poppet 902. The bearing 904 may contact the valve seat 204 of the pin 202 when the pyrotechnic device 110 is disengaged. The valve seat 204 of the pin 202 maintains compression on the bearing 904 which, in turn, compress the washers 214 and the poppet 902 closed in the first position when the pyrotechnic device 110 is disengaged.

According to at least some embodiments, the bearing 904 includes an extension portion 906 which extends into the poppet 902. The bearing 904 and/or the poppet 902 transition between the first position and the second position, to be described in further detail below. Washers 214 may be disposed around the extension portion 906 of the bearing 904 and between a portion of the bearing 904 and the poppet 902 as shown in FIG. 9. The washers 214 provide a pre-load force against the valve seat 204 when the pyrotechnic device 110 is disengaged, as described above.

The pin assembly 102 may include a shoulder 216 for supporting the pin 202 when the pyrotechnic device 110 is disengaged. The pin 202 is configured to translate through the pin assembly channel 218 as the pyrotechnic device 110 is engaged. The crush cap 220 is configured to maintain the pin 202 within the pin assembly 102 when the pyrotechnic device 110 is engaged. For example, the pyrotechnic device 110 creates pressure in the pin assembly 102, e.g., in the expandable cavity 224. The pressure created by the pyrotechnic device 110 when the pyrotechnic device is engaged fills the expandable cavity 224 and pushes the pin 202 up from the shoulder 216 toward the crush cap 220. When the pyrotechnic device 110 is engaged, the pin 202 translates through the pin assembly channel 218 such that the valve seat 204 does not contact the bearing 904 and the bearing 904, the washers 214 and/or the poppet 902 can translate to the second position through channel 908, to be described in detail below.

In the first position, as shown in FIG. 9, fluid is sealed at the inlet 106 of the valve system by the poppet 902. Fluid does not flow through the valve body 104 when the bearing 904, the washers 214, and/or the poppet 902 are in the first position. The poppet 902 may include additional sealing elements 910, such as O-rings, spring energized seals, or the like, disposed around the outer surface of the poppet 902 for sealing fluid at the inlet 106 and maintaining the position of the bearing 904 and the poppet 902 within the valve body 104.

Valve body 104 may further include a threaded resetting port 912. In various embodiments, a resetting screw (not shown) may include corresponding threads to the threaded resetting port 912. The resetting screw may be threaded through the threaded resetting port 912 and into channel 908 to contact the bearing 904 and apply a force to the bearing 904, the washers 214, and/or the poppet 902 such that the bearing 904, the washers 214, and/or the poppet 902 are repositioned to the first position after the pyrotechnic device 110 has been engaged. The resetting screw may be unthreaded from the threaded resetting port 912 once the pin assembly 102 has been installed (e.g., as shown in FIG. 9) and the threaded resetting port 912 may be sealed, in some embodiments, with an environmental plug, or the like, during operation of the valve system 900.

Figure 10:
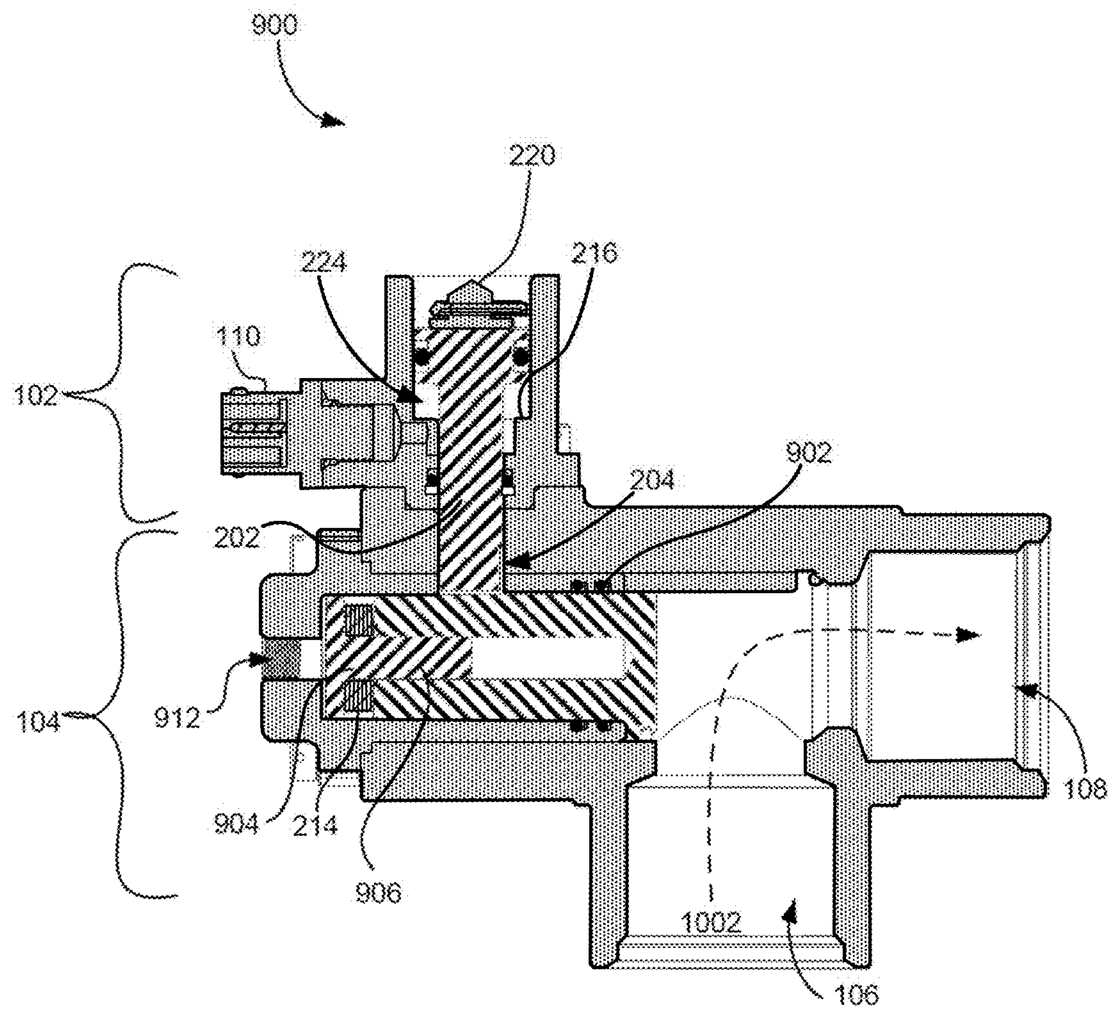
FIG. 10 is a side cross section of an embodiment of a resettable pyrotechnically actuated poppet valve system in a second position.

FIG. 10 is a side cross section of an embodiment of a resettable pyrotechnically actuated poppet valve system in a second position. The description of the valve system 100, valve system 400, and valve system 900 described in relation to FIGS. 1-9 is applicable to the side cross section of an embodiment of a resettable pyrotechnically actuated poppet valve system in a second position. Valve system 900 is shown in the second position where the pyrotechnic device 110 is engaged.

The pin assembly 102 may include a shoulder 216 for supporting the pin 202 when the pyrotechnic device 110 is disengaged. The pin 202 translates through the pin assembly channel 218 as the pyrotechnic device 110 is engaged and contacts the crush cap 220 within the pin assembly 102. For example, the pyrotechnic device 110 creates pressure in the pin assembly 102, e.g., in the expandable cavity 224. The pressure created by the pyrotechnic device 110 when the pyrotechnic device is engaged fills the expandable cavity 224 and pushes the pin 202 up from the shoulder 216 toward the crush cap 220. When the pyrotechnic device 110 is engaged, the pin 202 translates through the pin assembly channel 218 such that the valve seat 204 does not contact the washers 214, the bearing 904, and/or the poppet 902. The washers 214, the bearing 904, and/or the poppet 902 can translate to the second position, as shown in FIG. 10. In the second position, as shown in FIG. 10, fluid flows 1002 through the inlet 106 of the valve system 900 and through the outlet 108 when the washers 214, the bearing 904, and/or the poppet 902 are in the second position.

Figure 11:
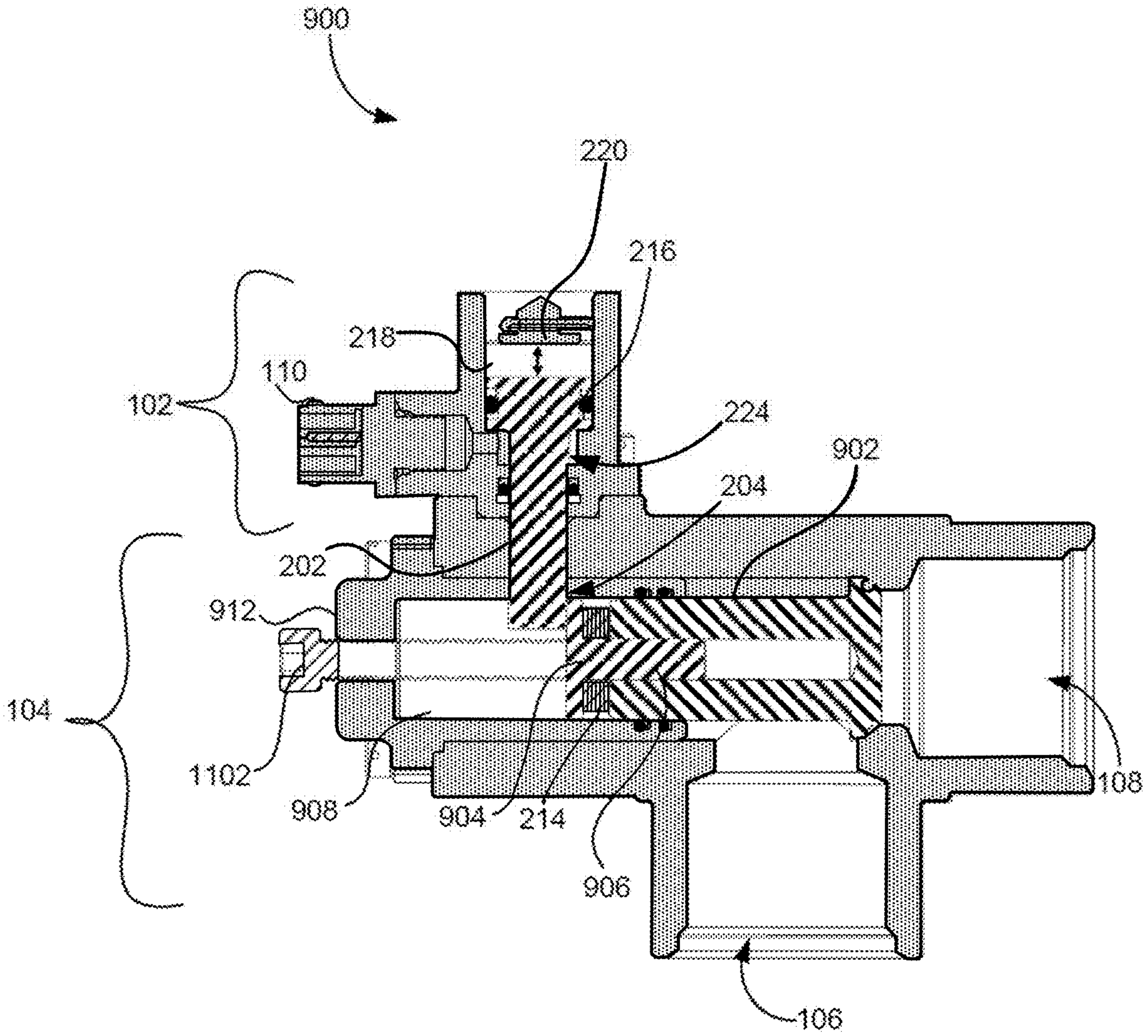
FIG. 11 is a side cross section of an embodiment of a resetting screw and a resettable pyrotechnically actuated poppet valve system.

FIG. 11 is a side cross section of an embodiment of a resetting screw and a resettable pyrotechnically actuated poppet valve system. The description of the valve system 100, valve system 400, and valve system 900 described in relation to FIGS. 1-10 is applicable to the side cross section of an embodiment of a resetting screw and a resettable pyrotechnically actuated poppet valve system. As shown in FIG. 11, a resetting screw 1102 is shown for resetting the washers 214, the bearing 904, and/or the poppet 902 to the first position within the valve body 104. The valve body 104 may include the threaded resetting port 912 having corresponding threads of the resetting screw 1102 such that the resetting screw 1102 may be threaded through the threaded resetting port 912 until the resetting screw 1102 contacts the bearing 904 and pushes the washers 214, the bearing 904, and/or the poppet 902 to the first position. According to various embodiments, the resetting screw 1102 is used to apply a force to the bearing 904 outside the flow path. Resetting the poppet 902 is accomplished by threading the resetting screw 1102 to compress the bearing 904 and the washers 214 and re-inserting a pin assembly 102 (e.g., a new pin assembly or a reused one). The resetting screw 1102 is removed and an environmental plug (not shown) may be threaded through the corresponding threads of the threaded resetting port 912 to seal the valve system 900.

According to at least some embodiments described herein, various components of any of the valve systems (e.g., valve system 100, valve system 400, valve system 900, etc.) may include 6061 aluminum, 7050 series aluminum, 7075 series aluminum, 2024 aluminum, 316 stainless steel, 304 stainless steel, A286 stainless steel, nickel alloys such as Inconel 718 or Inconel 625, etc., or any combination thereof.

According to various embodiments, sealing elements described herein may include Teflon (e.g., polytetrafluoroethylene (PTFE)), Torlon, Vespel, polyetheretherketone (PEEK), nylon, PCTFE, Delrin (e.g., polyoxymethylene (POM)), silicone, Viton (FKM), FFKM, fluorosilicone, nitrile rubber, ethylene propylene diene terpolymer (EPDM), etc., or any combination thereof.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A resettable pyrotechnically actuated poppet valve system comprising:

a pin assembly comprising:

a pin for engaging a moveable poppet closed against a valve seat;

one or more Belleville washers disposed around an extension portion of the poppet, the one or more Belleville washers providing a pre-load force biasing the poppet against the valve seat when a pyrotechnic device is disengaged, wherein pressure applied to the poppet overcomes the pre-load as the poppet transitions to a first position; and a shoulder for supporting the pin when a pyrotechnic device is disengaged;

and a valve body coupled to the pin assembly, the valve body having an inlet and an outlet;

and an internal valve body disposed within the valve body, the internal valve body comprising a resealable port for receiving pressure within a channel, wherein the pin maintains the poppet closed against the valve seat in the first position when the pyrotechnic device is disengaged, wherein a fluid and/or gas is sealed at the inlet when the poppet is in the first position, wherein the poppet transitions to a second position by movement of the pin when the pyrotechnic device is engaged, wherein the poppet is disposed within the internal valve body for contacting the valve seat, the poppet comprising:

a sealed piston defining the channel, wherein the pressure received in the channel returns the poppet to the first position after the pyrotechnic device is engaged.

2. The system of claim 1, further comprising the pyrotechnic device, wherein the pyrotechnic device creates pressure in the pin assembly for displacing the pin from the shoulder when the pyrotechnic device is engaged.

3. The system of claim 2, wherein the pyrotechnic device is built to NASA SEB 26100001, wherein the pyrotechnic device is selected from the group consisting of: a National Aeronautics and Space Administration (NASA) Standard Initiator (NSI), a Triton Standard Initiator (TSI)-200, a TSI-300, an Ensign-Bickford Aerospace & Defense S76-191, and a Pacific Scientific Initiator 103377-500.

4. The system of claim 1, the pin assembly further comprising a crush cap for maintaining the pin within the pin assembly when the pyrotechnic device is engaged.

5. The system of claim 1, wherein the sealed piston comprises an O-ring or spring energized seal.

6. The system of claim 1, wherein the fluid and/or gas flows through the inlet, around the internal valve body, and through the outlet when the poppet is in the second position.

* * * * *